(12) United States Patent
Azuma et al.

(10) Patent No.: US 11,162,965 B2
(45) Date of Patent: Nov. 2, 2021

(54) AUTOMATIC ANALYZER

(71) Applicant: Hitachi High-Technologies Corporation, Tokyo (JP)

(72) Inventors: Shinji Azuma, Tokyo (JP); Isao Yamazaki, Tokyo (JP); Masashi Fukaya, Tokyo (JP); Takumi Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 395 days.

(21) Appl. No.: 16/463,965

(22) PCT Filed: Nov. 8, 2017

(86) PCT No.: PCT/JP2017/040262
§ 371 (c)(1),
(2) Date: May 24, 2019

(87) PCT Pub. No.: WO2018/110158
PCT Pub. Date: Jun. 21, 2018

(65) Prior Publication Data
US 2020/0378997 A1 Dec. 3, 2020

(30) Foreign Application Priority Data
Dec. 13, 2016 (JP) .............................. JP2016-240816

(51) Int. Cl.
*G01N 35/10* (2006.01)
*G01N 35/00* (2006.01)

(52) U.S. Cl.
CPC .......... *G01N 35/1016* (2013.01); *B01L 13/02* (2019.08); *G01N 35/1095* (2013.01); *G01N 2035/00237* (2013.01)

(58) Field of Classification Search
None
See application file for complete search history.

(56) References Cited

U.S. PATENT DOCUMENTS 5,004,582 A * 4/1991 Miyata ...................... B01L 7/00
422/404
5,614,089 A * 3/1997 Allington ........... B01D 11/0203
210/198.2
(Continued)

FOREIGN PATENT DOCUMENTS

ER    2 940 477 A1    11/2015
JP    56-172762 U    12/1981
(Continued)

OTHER PUBLICATIONS

Extended European Search Report issued in European Application No. 17879938.3 dated Jun. 16, 2020 (nine (9) pages).
(Continued)

*Primary Examiner* — Brian R Gordon
(74) *Attorney, Agent, or Firm* — Crowell & Moring LLP

(57) ABSTRACT

The object of the invention is to avoid a decrease in dispensing accuracy of a sample, a reagent, or the like as a temperature changes. In an automatic analyzer, a dispensing nozzle sucks the sample from a sample container holding the sample and discharges the sample to a reaction container. A syringe pump controls an amount of change in a volume of water. A first pipe connects the dispensing nozzle and the syringe pump. An electromagnetic valve flows or stops the water. A second pipe connects the electromagnetic valve and the syringe pump. A branch pipe branches the water. A third pipe connects the electromagnetic valve and the branch pipe. A case accommodates at least the syringe pump, the first pipe, the electromagnetic valve, the second pipe, the branch pipe, and the third pipe. Further, the third pipe includes a heat exchange unit that performs heat exchange of the water.

6 Claims, 3 Drawing Sheets

(56) References Cited

U.S. PATENT DOCUMENTS

| | | | | |
|---|---|---|---|---|
| 5,635,070 | A * | 6/1997 | Allington | B01D 11/0203 210/416.1 |
| 6,265,226 | B1 * | 7/2001 | Petro | B01D 15/08 422/504 |
| 6,548,026 | B1 * | 4/2003 | Dales | B01F 15/00207 374/E13.001 |
| 9,170,028 | B1 * | 10/2015 | Beer | C12M 41/12 |
| 2003/0062067 | A1 * | 4/2003 | Meyer | B01L 9/523 134/25.4 |
| 2003/0116438 | A1 * | 6/2003 | Yamazaki | G01N 27/44782 204/601 |
| 2003/0157721 | A1 * | 8/2003 | Turner | B01L 3/50853 436/148 |
| 2004/0168529 | A1 * | 9/2004 | Carlson | G01N 33/15 73/866 |
| 2006/0228807 | A1 | 10/2006 | Nagai et al. | |
| 2006/0257999 | A1 * | 11/2006 | Chang | C40B 60/06 435/289.1 |
| 2008/0121015 | A1 * | 5/2008 | Heuvel | G01N 30/28 73/23.4 |
| 2008/0240998 | A1 * | 10/2008 | Urbahn | G01R 33/282 422/400 |
| 2010/0077874 | A1 * | 4/2010 | Kanomata | B01D 11/0203 73/863.21 |
| 2010/0101652 | A1 * | 4/2010 | Shiraishi | G01N 35/1095 137/1 |
| 2011/0232769 | A1 * | 9/2011 | Nichogi | G01N 35/025 137/3 |
| 2012/0052560 | A1 * | 3/2012 | Knight | G01N 35/1095 435/286.1 |
| 2013/0045496 | A1 * | 2/2013 | Jansen | C12Q 1/689 435/8 |
| 2016/0003383 | A1 * | 1/2016 | Zeko | B01D 15/10 435/305.1 |
| 2016/0195564 | A1 * | 7/2016 | Hewitson | G01N 30/06 436/54 |
| 2017/0246558 | A1 * | 8/2017 | James | C07C 231/24 |
| 2018/0120340 | A1 | 5/2018 | Yasui et al. | |
| 2018/0246132 | A1 * | 8/2018 | Mori | G01N 35/1002 |
| 2019/0361042 | A1 * | 11/2019 | Yasui | G01N 35/025 |
| 2021/0018522 | A1 * | 1/2021 | Yamashita | G01N 35/025 |
| 2021/0077991 | A1 * | 3/2021 | Edwards | B01L 3/0203 |

FOREIGN PATENT DOCUMENTS

| | | |
|---|---|---|
| JP | 62-137565 A | 6/1987 |
| JP | 6-40837 U | 5/1994 |
| JP | 2001-228160 A | 8/2001 |
| JP | 2006-292732 A | 10/2006 |
| JP | 2013-53935 A | 3/2013 |
| JP | 2014-92427 A | 5/2014 |
| JP | 2015-114120 A | 6/2015 |
| WO | WO 2016/170994 A1 | 10/2016 |

OTHER PUBLICATIONS

International Search Report (PCT/ISA/210) issued in PCT Application No. PCT/JP2017/040262 dated Feb. 6, 2018 with English translation (four (4) pages).

Japanese-language Written Opinion (PCT/ISA/237) issued in PCT Application No. PCT/JP2017/040262 dated Feb. 6, 2018 (five (5) pages).

* cited by examiner

[FIG. 1]
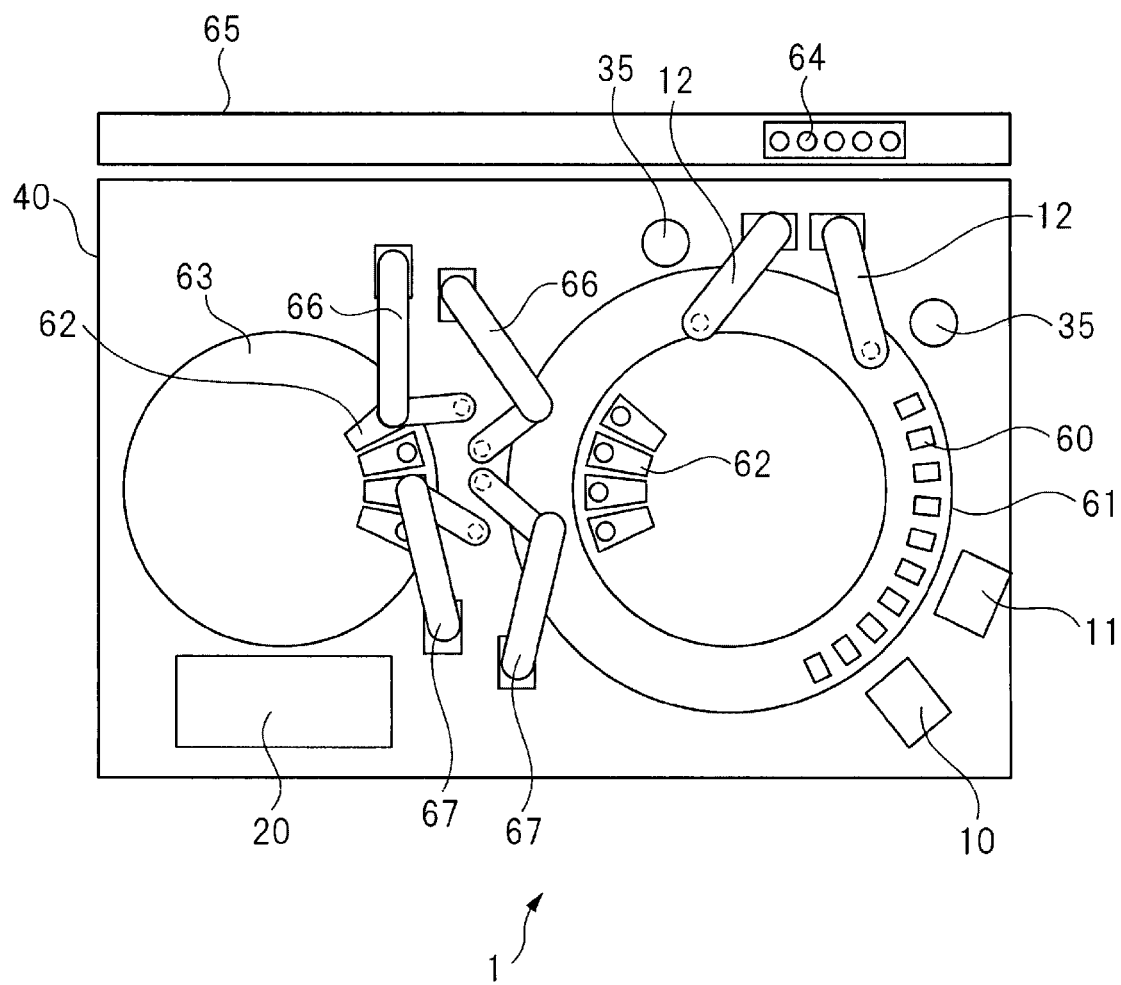

[FIG. 2]
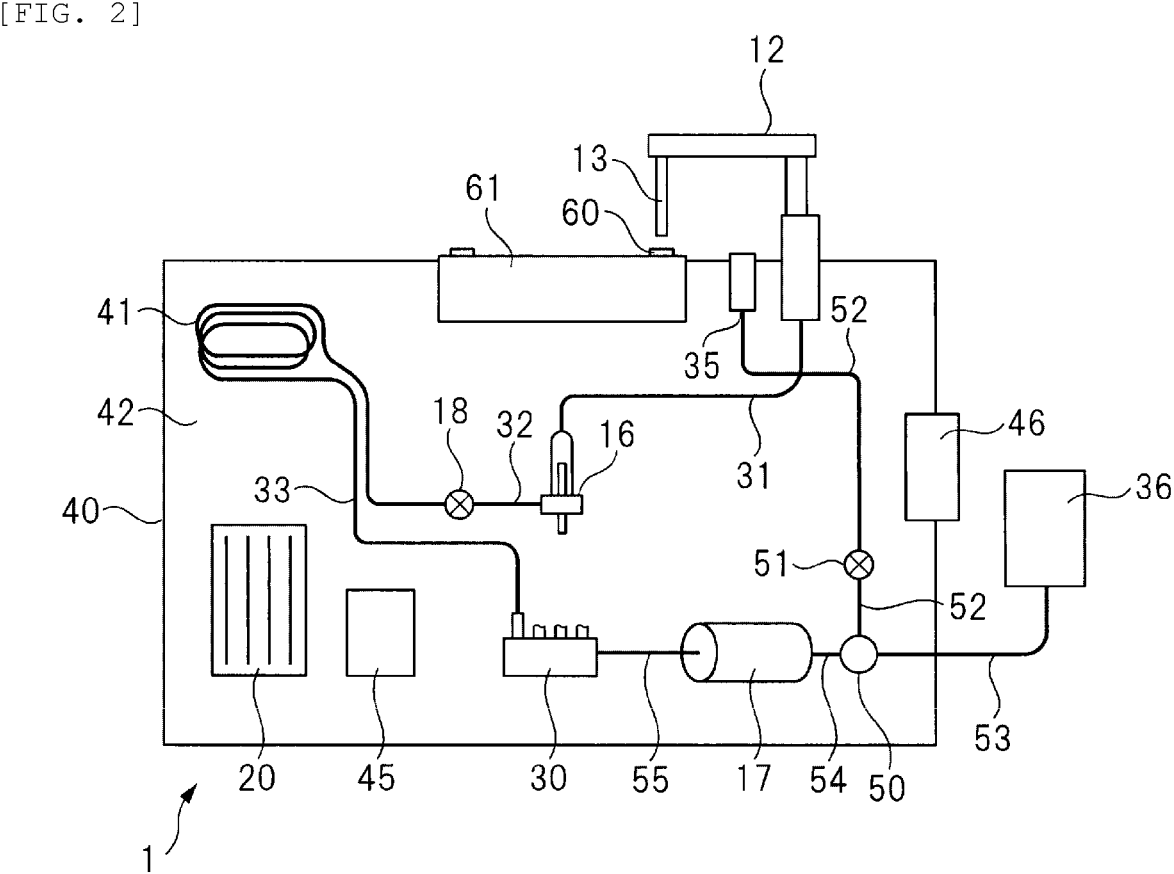

[FIG. 3]
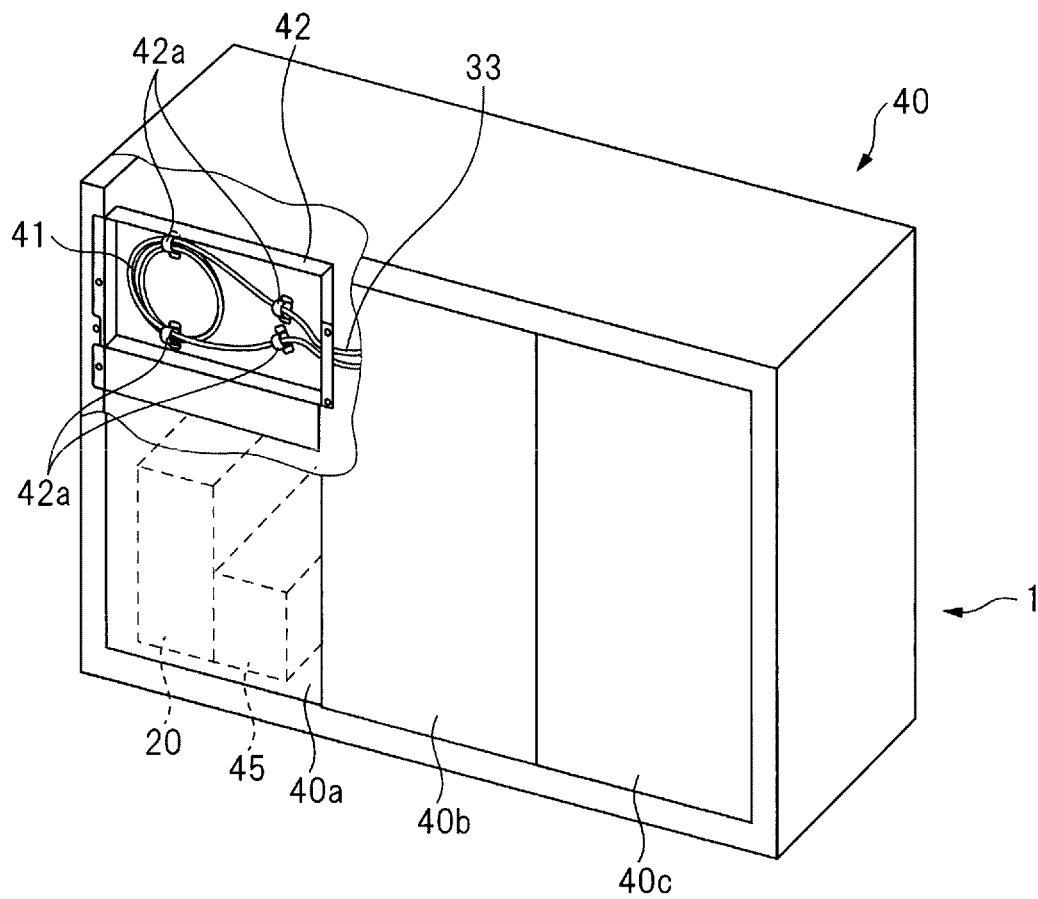
[FIG. 4]
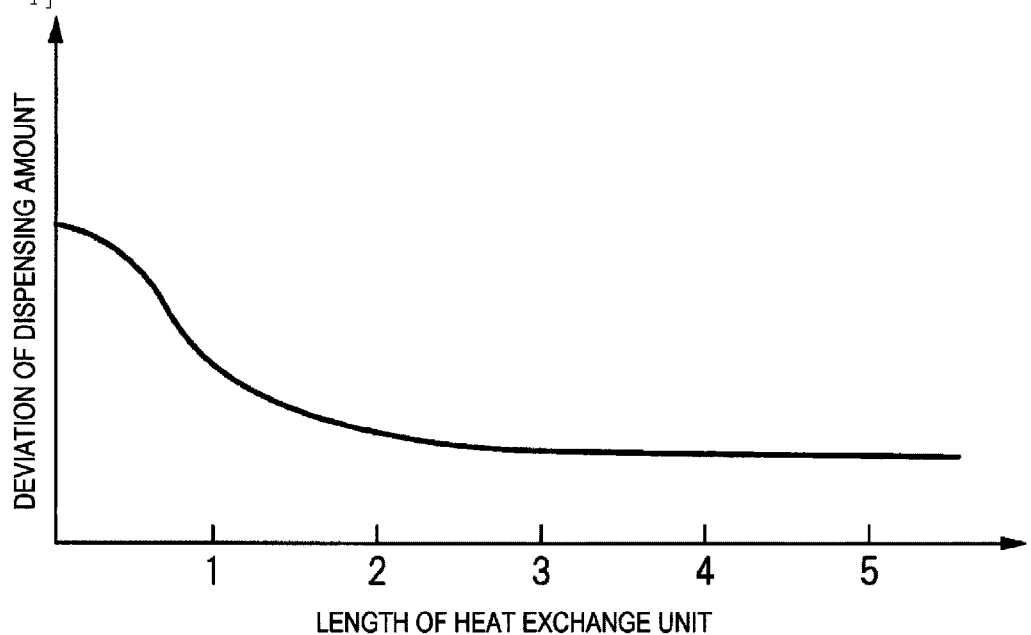

AUTOMATIC ANALYZER

TECHNICAL FIELD

The present invention relates to an automatic analyzer, and particularly relates to techniques effective for accuracy in analysis of a sample component such as blood.

BACKGROUND ART

An automatic analyzer performs qualitative and quantitative analysis of a sample component such as blood or urine, and requires accuracy in a dispensing amount of a sample or a reagent since a mixing ratio of the dispensing amounts of the sample and the reagent is important in order to ensure analysis accuracy.

In this kind of automatic analyzer, a dispensing mechanism includes a pipe that is internally filled with ion-exchanged water as a pressure transmission medium by driving a movable plunger in a syringe pipe and a dispensing nozzle, and controls a dispensing amount by controlling a driving amount of the plunger.

The internal side and the external side of a dispensing probe are cleaned in order to avoid a carryover influence on the analysis result every time the dispensed sample changes, and a method using ion-exchanged water as a pressure transmission medium is generally used for cleaning the internal side.

A volume change during a dispensing operation of the ion-exchanged water as a pressure transmission medium is required to be extremely small with respect to the dispensing amount to ensure the accuracy of the dispensing amount, and degassed water is used to avoid generation of bubbles due to pressure changes.

In addition, there is a concern that a temperature change in the pipe may influence the dispensing accuracy. Accordingly, as a technique that reduces the temperature change in the pipe, it is known to control the temperature of supplied cleaning water equal to a fluid temperature in a dispensing nozzle, for example, by providing a bypass flow path in the middle of a dispensing flow path (see, for example, PTL 1).

PRIOR ART LITERATURE

Patent Literature

PTL 1: JP-A-2013-053935

SUMMARY OF INVENTION

Technical Problem

In recent years, it is important to reduce the amount of reaction liquid per analysis item for the purpose of, for example, dealing with a trace amount of a sample of a child or the like, reducing a burden on a patient, controlling the amount of waste liquid from environmental consideration, or reducing a reagent cost. Extreme reduction of the dispensing amount of the sample in the analysis is underway since it is necessary to ensure a ratio of the sample to the reagent.

In addition, a volume change of system water as a pressure transmission medium in the dispensing pipe is caused by variations in internal temperatures of different parts including a syringe in a device, by a fluid temperature originated from the supplying temperature of the system water, and by a temperature difference of the pipe caused by the ambient temperature. Therefore, the volume change in the pipe changes with a moving amount of the system water in the pipe during the dispensing operation.

With regard to the moving amount of the system water during the dispensing operation, a cleaning operation needs a moving amount of several tens of times or more with respect to an operation of sucking and discharging the sample, and an amount of the volume change greatly differs between a case where the cleaning operation is included and a case where the cleaning operation is not included in the dispensing operation.

In addition, in a case where the volume change with or without the cleaning operation is regarded to be constant when the cleaning time is irrelevant to the dispensing amount, the amount of the volume change is also constant, so that a proportion at which the dispensing amount is influenced increases along with the extreme reduction of the dispensing amount.

In fact, with regard to a contaminated range of the probe, it is difficult to reduce the cleaning time according to a volume rate when a case of sucking and discharging a dummy amount with respect to an actual dispensing amount is considered, and the influence on the dispensing accuracy during the cleaning operation occurs with the extreme reduction of the dispensing amount.

Further, there is a technique of performing temperature control in an entire flow path in order to avoid the volume change of the system water in such a flow path. However, it is difficult to control the entire flow path since there are many factors that cause thermal changes in the automatic analyzer.

Further, it is also effective to shorten the length of the influenced pipe by configuring a syringe mechanism and a nozzle driving mechanism as close as possible. However, in this case, the syringe mechanism is limited to be disposed on the device at a position with good accessibility since it is necessary to visually check a replacement and maintenance state or an operation state of a driving seal unit.

Therefore, there are many cases where it is difficult to realize a configuration in which two adjacent mechanisms are disposed when the nozzle driving mechanism also includes other device layout restrictions. In addition, it is also potential to have a heat influence since the syringe mechanism itself includes a driving unit in a case where temperature control of an entire system is considered.

An object of the invention is to provide a technique capable of avoiding a decrease in dispensing accuracy of a sample, a reagent, or the like as the temperature changes.

The above and other objects and novel features of the invention will become apparent from the description of this description and the accompanying drawings.

Solution to Problem

Typical ones of the invention disclosed in the present application will be briefly described as follows.

That is, a typical automatic analyzer includes a dispensing nozzle, a syringe pump, a first pipe, a first electromagnetic valve, a second pipe, a branch pipe, a third pipe, and a case. The dispensing nozzle sucks a sample from a sample container holding the sample and discharges the sample to a reaction container.

The syringe pump controls an amount of change in a volume of a fluid. The first pipe connects the dispensing nozzle and the syringe pump. The first electromagnetic valve flows or stops the fluid. The second pipe connects the first electromagnetic valve and the syringe pump.

The branch pipe branches the fluid. The third pipe connects the first electromagnetic valve and the branch pipe. The case accommodates at least the syringe pump, the first pipe, the first electromagnetic valve, the second pipe, the branch pipe, and the third pipe.

Further, the third pipe includes a heat exchange unit that performs heat exchange of the fluid.

Particularly, an amount of the fluid held by each of the third pipe and the heat exchange unit is larger than an amount of the fluid that passes through the electromagnetic valve when the electromagnetic valve is opened and the dispensing nozzle is cleaned.

In addition, the heat exchange unit has heat exchanging capacity of eliminating a difference between a temperature inside the case and a temperature of the fluid in the heat exchange unit.

Advantageous Effect

Effects obtained by typical ones of the invention disclosed in the present application will be briefly described as follows.

It is possible to analyze a sample component with high accuracy.

BRIEF DESCRIPTION OF DRAWINGS

FIG. 1 is a top view showing an example of a configuration of an automatic analyzer according to an embodiment.

FIG. 2 is an explanatory view showing an example of a main configuration inside a case included in the automatic analyzer in FIG. 1.

FIG. 3 is an explanatory view showing an example of a configuration of a third pipe included in the automatic analyzer in FIG. 2.

FIG. 4 is an explanatory view showing an example of a length of a heat exchange unit included in the automatic analyzer in FIG. 2 and experimental data obtained by measuring the effect thereof.

DESCRIPTION OF EMBODIMENTS

The same components are generally denoted by the same reference symbols throughout the drawings for describing the embodiments, and the repetitive description thereof will be omitted.

Hereinafter, embodiments will be described in detail.
(Configuration Example of Automatic Analyzer)

FIG. 1 is a top view showing an example of a configuration of an automatic analyzer 1 according to the embodiment.

As shown in FIG. 1, the automatic analyzer 1 includes a reagent disk 63, a conveying mechanism 65, a reaction disk 61, a sample dispensing mechanism 12, a first reagent dispensing mechanism. 66, a second reagent dispensing mechanism 67, a reaction container cleaning mechanism 11, a spectrophotometer 10, a device control unit 20, a power supply unit 45, a water supply tank 36, a dispensing unit to be described later, and a fan 46. The device control unit 20, the power supply unit 45, the water supply tank 36, the dispensing unit, and the fan 46 are shown in FIG. 2 to be described later.

The reagent disk 63, the reaction disk 61, the sample dispensing mechanism 12, the first reagent dispensing mechanism 66, the second reagent dispensing mechanism 67, the reaction container cleaning mechanism 11, and the spectrophotometer 10 are provided on a top surface of the case 40 having a shape of, for example, rectangular solid. Further, the conveying mechanism 65 is provided on a side of a rear surface of the case 40.

The conveying mechanism 65 conveys a sample container 64 holding a sample to be analyzed. The reagent disk 63 is mounted with a reagent bottle 62 holding a reagent. The reaction disk 61 annularly arranges reaction containers 60 in which the sample and the reagent react.

The sample dispensing mechanism 12 dispenses the sample sucked from the sample container 64 to the reaction containers 60. The first reagent dispensing mechanism 66 and the second reagent dispensing mechanism 67 dispense the reagent sucked from the reagent bottle 62 in the reagent disk 63 to the reaction containers 60. The reaction container cleaning mechanism 11 cleans the reaction containers 60. The spectrophotometer 10 is disposed near the outer periphery of the reaction disk 61 and measures the absorbance of the reaction liquid. The power supply unit 45 as a power supply part generates an operational power supply for the automatic analyzer 1.
(Configuration Example Inside Case)

A configuration inside the case 40 will be described below.

FIG. 2 is an explanatory view showing an example of a main configuration inside the case 40 included in the automatic analyzer 1 in FIG. 1. FIG. 2 shows a front view of the case 40.

The case 40 is internally provided with the dispensing unit, the device control unit 20, the power supply unit 45, and the fan 46. The dispensing unit includes a high pressure pump 17, a branch pipe 30, an electromagnetic valve 18, a third pipe 33, a heat exchange unit 41, a syringe pump 16, a second pipe 32, a first pipe 31, a circulation pump 50, an electromagnetic valve 51, and pipes 52 to 55.

Further, the case 40 is externally provided with the water supply tank 36. The water supply tank 36 stores water used as a pressure transmission medium such as ion-exchanged water which is a fluid. The water supply tank 36 is provided in, for example, a room where the automatic analyzer 1 is installed. Alternatively, the water supply tank may also be provided outdoors.

The device control unit 20 controls the entire operation of the automatic analyzer 1 and performs data exchange with outside. The circulation pump 50 is connected to the water supply tank 36 through the pipe 53 and circulates the water used as the pressure transmission medium.

The electromagnetic valve 51 as a second electromagnetic valve is connected to an output unit on one side of the circulation pump 50. The electromagnetic valve 51 is controlled by the device control unit 20 to be on or off and flows or stops water in the water supply tank 36 with respect to the cleaning tank 35. The output unit on one side of the circulation pump 50, the electromagnetic valve 51, and the cleaning tank 35 are connected through the pipe 52.

The high pressure pump 17 is connected to the circulation pump 50 through the pipe 54 and pressurizes the water used as the pressure transmission medium discharged from the circulation pump 50. The branch pipe 30 includes an inlet and a plurality of outlets, and the high pressure pump 17 is connected to the inlet of the branch pipe 30 through the pipe 55.

Among the plurality of outlets of the branch pipe 30, one outlet is connected to the electromagnetic valve 18 through the third pipe 33. The other outlets of the branch pipe 30 are connected to other systems such as the first reagent dispensing mechanism 66 and the second reagent dispensing mechanism 67 through pipes (not shown).

In addition, the electromagnetic valve 18 as the first electromagnetic valve is connected to the syringe pump 16 through the second pipe 32. The electromagnetic valve 18 is controlled by the device control unit 20 to be on or off and flows or stops the water used as the pressure transmission medium from the branch pipe 30.

The syringe pump 16 sucks and discharges a specified amount of the water used as the pressure transmission medium under the control of the device controller 20. The syringe pump 16 is connected to the dispensing nozzle 13 through the first pipe 31.

The reaction disk 61 on which the reaction container 60 is mounted, the cleaning tank 35 used to clean the nozzle, and the sample container 64 on the conveying mechanism 65 shown in FIG. 1 are included in a movable range of the dispensing nozzle 13 that is moved by the sample dispensing mechanism 12.

In addition, as shown in FIG. 2, the fan 46 is provided on a right side surface of the case 40. The fan 46 uniforms the temperature inside the case 40 by introducing air into the case 40 or discharging air inside the case 40.

As shown in FIG. 2, the device control unit 20 is provided on a lower left side in the case 40, and the power supply unit 45 is provided on a right side of the device control unit 20.

Here, a part of the third pipe 33 that connects the outlet of the branch pipe 30 and the electromagnetic valve 18 forms the heat exchange unit 41. The heat exchange unit 41 is formed by, for example, a turning part obtained by extending the third pipe 33 and winding the extended pipe for a plurality of times.

The heat exchange unit 41 is provided on an upper side inside the case 40. More preferably, as shown in FIG. 2, the heat exchange unit is provided directly above at least one of the device control unit 20 and the power supply unit 45. Further, the number of times of winding is not limited to a plurality of times and may also be one time.

In addition, an internal capacity of the third pipe 33, particularly an internal capacity subsequent to the heat exchange unit 41, is set to be larger than an amount of the water flowing through the electromagnetic valve 18 during the time when the electromagnetic valve 18 is opened, that is, in an ON state.

Further, a length of the third pipe 33 including the heat exchange unit 41 is formed to be longer than a sum of a length of the second pipe 32 and a length of the first pipe 31. In other words, the third pipe 33 including the heat exchange unit 41 has a shape that a surface area of the pipe is increased such that the efficiency of heat exchange with ambient air is high.

(In Respect of Shape and Fixing of Heat Exchange Unit)

A technique of fixing the heat exchange unit 41 of the third pipe 33 will be described below.

FIG. 3 is an explanatory view showing an example of a configuration of the third pipe included in the automatic analyzer 1 in FIG. 2.

FIG. 3 shows a view focusing on the case 40 and the heat exchange unit 41 and omitting other configurations in order to better understand the technique of fixing the heat exchange unit 41.

As described above, the heat exchange unit 41 is formed by the turn part obtained by extending the third pipe 33 and winding the extended pipe for a plurality of times. The heat exchange unit 41 is accommodated in a heat exchange unit accommodating part 42. As shown, the heat exchange unit accommodating part 42 is formed in a tray shape with a shallow depth. Further, FIG. 3 shows an example in which the heat exchange unit 41 is configured by a turning part obtained by winding the pipe for a plurality of times, but the shape of turning the pipe is not limited thereto.

The heat exchange unit accommodating part 42 is internally provided with the heat exchange unit 41, that is, a plurality of clips 42a that fixes the pipe of the turning part forming a heat exchange unit, and the heat exchange unit 41 is fixed by the clips 42a.

As shown in FIG. 3, a front surface of the case 40 is provided with, for example, three doors 40a to 40c from a left side to a right side. The heat exchange unit accommodating part 42 is attached at a position on an upper left portion of the front surface of the case 40.

A surface of an opening of the tray-shaped heat exchange unit accommodating part 42 faces toward the door 40a of the case 40, and the opening is closed by a rear surface of the door 40a in a state where the door 40a is closed. Thus, the heat exchange unit 41 is in a state of being sealed in the heat exchange unit accommodating part 42.

Accordingly, it is possible to prevent air flowed or discharged from the fan 46 in FIG. 2 from directly blowing the heat exchange unit 41 by accommodating the heat exchange unit 41 in the heat exchange unit accommodating part 42. As a result, it is possible to avoid the heat exchange unit 41 being excessively warmed or cooled.

In addition, the device control unit 20 and the power supply unit 45 as heat generating parts are provided below the heat exchange unit 41 inside the case 40. The device control unit 20 and the power supply unit 45 are shown by dotted lines in FIG. 3. It is possible to improve the efficiency of heat exchange through the ascending airflow from the heat generating parts.

Further, the heat exchange unit 41 is provided above the heat generating parts, and thereby when the automatic analyzer 1 is activated, it is possible to rise the temperature quickly and achieve the effect of realizing accurate dispensing from the beginning even when the case 40 is cold inside.

Here, a compressor (not shown) is provided in the case 40 in the automatic analyzer. The compressor includes a cooling device that cools a reagent storage (not shown) included in the automatic analyzer 1.

The compressor generates a very large amount of heat. Therefore, the heat exchange unit 41 is preferably disposed at a position away from the compressor as far as possible, and more preferably disposed at a position opposite to the compressor. Therefore, in the case of FIG. 3, for example, the compressor may be provided on a door 40c side of the case 40.

The shape of the heat exchange unit accommodating part 42 is not particularly limited, and the shape may be any shape such as a hollow rectangular solid shape that can accommodate the heat exchange unit 41 and can be prevented from being directly blown by the airflow from the fan 46.

(Example of Dispensing Operation and Function of Heat Exchange Unit)

A dispensing operation of the sample and a function of the heat exchange unit 41 in the automatic analyzer 1 will be described below with reference to FIG. 1 and FIG. 2. The dispensing operation in the automatic analyzer 1 is mainly performed under the control of the device control unit 20.

Dispensing is performed in a state where a flow path of a dispensing system is filled with water used as the pressure transmission medium. First, the syringe pump 16 sucks to introduce a trace amount of air into the dispensing nozzle 13 when a tip end of the dispensing nozzle 13 is in air. Then, the dispensing nozzle 13 is inserted into the sample container 64, and a suction operation with an amount larger than the dispensing amount is performed.

Next, the dispensing nozzle 13 is moved to the cleaning tank 35, the syringe pump 16 is caused to perform a discharging operation with a trace amount, and meanwhile external cleaning water is sprayed to the outside of the dispensing nozzle 13 in the cleaning tank 35. Thereafter, the dispensing nozzle 13 is inserted into one of the reaction containers 60 on the reaction disk 61, and the syringe pump 16 is caused to perform a discharging operation with an amount just corresponding to the dispensing amount.

In a case where the next analysis is performed on the same sample, the dispensing nozzle 13 is inserted into the same sample container 64, and a suction operation with an amount larger than the dispensing amount is performed. Then, the dispensing nozzle 13 is moved to the cleaning tank 35, the syringe pump 16 is caused to perform a discharging operation with a trace amount, and meanwhile the external cleaning water is sprayed to the outside of the dispensing nozzle 13 in the cleaning tank 35.

Next, the dispensing nozzle 13 is moved to be inserted into a reaction container 60 different from the previous one by rotating the reaction disk 61, and the syringe pump 16 is caused to perform a discharging operation with an amount just corresponding to the dispensing amount.

In a case where the next analysis is performed on a different sample, the conveying mechanism 65 is driven to move another sample container 64 to a suction position of the dispensing nozzle 13. The dispensing nozzle 13 is moved to the cleaning tank 35, external cleaning water is sprayed to the outside of the nozzle, and meanwhile water pressurized by opening the electromagnetic valve 18 is discharged from the dispensing nozzle 13 through a flow path.

Thereafter, the syringe pump 16 sucks to introduce a trace amount of air into the dispensing nozzle 13 when the tip end of the dispensing nozzle 13 is in air, so as to start the dispensing operation.

As described above, the internal capacity of the internal capacity of the third pipe 33 including the heat exchange unit 41 is set to be larger than the amount of water flowing through the electromagnetic valve 18 during the time when the electromagnetic valve 18 is ON. Further, the length of the third pipe 33 including the heat exchange unit 41 is longer than the sum of the length of the second pipe 32 and the length of the first pipe 31.

Accordingly, the third pipe 33 including the heat exchange unit 41 has a capacity of keeping the temperature of water in the heat exchange unit 41 approximately equal to the temperature of ambient air during intervals. As a result, even when the temperature of water supplied from the water supply tank 36 and the temperature inside the case 40 are different, dispensing with high accuracy can be performed.

That is, in a case where the water temperature in the water supply tank 36 is low, when the electromagnetic valve 18 is opened to allow the water to flow into the second pipe 32 and the first pipe 31, and in a case where the temperature inside the case 40 is higher than the water temperature, the water temperature in the second pipe 32 and the first pipe 31 rises to cause the volume of the water to expand.

During the time when the dispensing nozzle 13 discharges the sample sucked from the sample container 64 to the reaction container 60, when the water in the second pipe 32 and the first pipe 31 expands, a part of the sample sucked in the dispensing nozzle 13 flows from the tip end of the dispensing nozzle 13, and the amount to be discharged to the reaction container 60 is larger than an expected dispensing amount.

On the other hand, in the automatic analyzer 1 shown in FIG. 2, water warmed to a temperature approximately equal to the temperature inside the case 40 by the heat exchange unit 41 enters the second pipe 32 and the first pipe 31 through the electromagnetic valve 18. Therefore, the water does not expand in the pipes of the second pipe 32 and the first pipe 31.

Therefore, the temperature of the supplied water is not influenced, and dispensing with high accuracy can be performed. As a result, it is possible to accurately analyze the concentration of a component to be evaluated.

Particularly, in a case where a plurality of items are analyzed for a same sample, a time difference occurs between the dispensing of a first item and the dispensing of second and subsequent items. This may cause a problem that the analysis accuracy of the first item is lowered due to a change in the expansion rate of water in the pipe.

However, as described above, since the water can be warmed to a temperature approximately equal to the temperature inside the case 40 by the heat exchange unit 41 in the automatic analyzer 1 shown in FIG. 2, the water does not expand and the analysis can be performed with high accuracy even for the first item.

In addition, since the heat exchange unit 41 of the automatic analyzer 1 in FIG. 2 has a long length, an amount of water larger than the amount of water flowing in when the electromagnetic valve 18 is opened can be heat-exchanged in the heat exchange unit 41.

Accordingly, since almost all amount of water that enters the second pipe 32 and the first pipe 31 has a temperature approximately equal to the temperature inside the case 40, the water inside the pipe does not expand and the analysis can be performed with high accuracy.

FIG. 4 is an explanatory view showing an example of the length of the heat exchange unit 41 included in the automatic analyzer 1 in FIG. 2 and experimental data obtained by measuring the effect thereof.

In FIG. 4, the horizontal axis represents the length of the heat exchange unit 41, and is in units of length of the capacity that corresponds to the amount of water flowing in when the electromagnetic valve 18 is opened. The vertical axis represents the deviation of the dispensing amount generated by the dispersion for the first item.

It can be seen from FIG. 4 that the deviation of the dispensing amount is smaller if the length of the heat exchange unit 41 is one or more times of the amount flowing in when the electromagnetic valve 18 is opened.

In addition, as described above, the sum of the length of the second pipe 32 and the length of the first pipe 31 is set to be shorter than the length of the third pipe 33. Therefore, since the volume of the water in the second pipe 32 and the first pipe 31 is smaller than that in the third pipe 33, even when the temperature change causes a change in the volume of the water, the influence is little and the analysis can be performed with high accuracy.

Further, as described above, the heat exchange unit 41 is accommodated in the heat exchange unit accommodating part 42 provided in the upper portion inside the case 40 of the automatic analyzer 1 in FIG. 2. Therefore, even in a case where temperature distribution occurs inside the case 40, heat exchange can be performed efficiently since the heat exchange unit is provided at a position with a relatively high temperature.

Accordingly, the temperature of the water passing through the electromagnetic valve 18 can be quickly brought close to the temperature inside the case 40, so that the analysis can be performed with high accuracy.

Further, since the third pipe 33 connected to the branch pipe 30 is included in the heat exchange unit 41, even when operations of other mechanisms such as reagent dispensing are performed in parallel, the operations do not affect the water inside the heat exchange unit 41.

Therefore, the electromagnetic valve 18 can be efficiently supplied with temperature controlled water, it is not necessary to increase the capacity of the heat exchange unit 41 in an useless manner, and the heat exchange unit 41 can be disposed in a small space. In addition, it is not necessary to separately provide the high pressure pump 17 for each mechanism.

Further, since the heat exchange unit 41 has a simple structure in which the third pipe 33 is winded, a special temperature control mechanism or the like is not necessary. Accordingly, it is possible to provide the automatic analyzer 1 that is less in components, low in cost and high in reliability.

Here, in the automatic analyzer 1, cleaning water is sprayed to the outside of the dispensing nozzle 13 in the cleaning tank 35 before the sample sucked from the sample container 64 is discharged to the reaction container 60. Therefore, even when the water in the pipe expands, the deviation of the dispensing amount is not influenced since the sample sprayed from the dispensing nozzle 13 is removed by the cleaning water.

Since the influence occurs only in a limited time when the dispensing nozzle 13 is moved from the cleaning tank 35 to the reaction container 60, dispensing with a small deviation can be performed and the analysis can be performed with high accuracy.

Further, the automatic analyzer 1 can cope with a case even where the temperature of the water supplied from the water supply tank 36 is higher than the temperature inside the case 40. For example, in a case where the water supply tank is disposed outdoors or the like, the outside temperature is high in summer or the like, and the water temperature in the water supply tank 36 rises.

In such a case, the water shrinks in the pipe, and the sample at the tip end of the dispensing nozzle 13 is drawn back during the time from when the dispensing nozzle 13 sucks the sample until the dispensing nozzle 13 discharges the sample.

However, in the automatic analyzer 1 shown in FIG. 2, the external cleaning water is sprayed while the discharging operation with a trace mount is performed in the cleaning tank 35 before the sample is discharged to the reaction container 60. This operation is performed by the control of, for example, the device control unit 20 controlling the operations of the circulation pump 50 and the electromagnetic valve 51.

Specifically, the circulation pump 50 is operated to suck the water in the water supply tank 36, and meanwhile the water as external cleaning water is sprayed by turning on the electromagnetic valve 51. Accordingly, the sprayed water is removed in a state where the drawn water is pushed out. Therefore, the shrinkage amount till that time does not influence the deviation of the dispensing amount.

Since the influence occurs only in a limited time when the dispensing nozzle 13 is moved from the cleaning tank 35 to the reaction container 60, dispensing with a small deviation can be performed even when the temperature of supplied water is high.

As described above, the automatic analyzer 1 capable of performing the analysis with high accuracy can be realized.

While the invention made by the inventor has been described in detail based on the embodiments, the invention is not limited to the above embodiments, and various modifications can be made without departing from the scope of the invention.

The invention is not limited to the embodiments described above, and includes various modifications. For example, the embodiments described above have been described in detail for easy understanding of the invention, and the invention is not necessarily limited to those including all the configurations described above.

Further, a part of the configuration of one embodiment can be replaced with the configuration of another embodiment, and it is also possible to add the configuration of one embodiment to the configuration of another embodiment. A part of the configuration of each embodiment may be added, deleted, or replaced with another configuration.

REFERENCE SIGN LIST

1 Automatic analyzer
10 Spectrophotometer
11 Reaction container cleaning mechanism
12 Sample dispensing mechanism
13 Dispensing nozzle
16 Syringe pump
17 High pressure pump
18 Electromagnetic valve
20 Device control unit
30 Branch pipe
31 First pipe
32 Second pipe
33 Third pipe
35 Cleaning tank
36 Water supply tank
40 Case
40a Door
40b Door
40c Door
41 Heat exchange unit
42 Heat exchange unit accommodating part
45 Power supply unit
46 Fan
50 Circulation pump
51 Electromagnetic valve
52 Pipe
53 Pipe
54 Pipe
55 Pipe
60 Reaction container
61 Reaction disk
62 Reagent bottle
63 Reagent disk
64 Sample container
65 Conveying mechanism
66 First reagent dispensing mechanism
67 Second reagent dispensing mechanism
67 Reagent dispensing mechanism

The invention claimed is:

1. An automatic analyzer, comprising:
a dispensing nozzle that sucks a sample from a sample container holding the sample and discharges the sample to a reaction container;
a syringe pump that controls an amount of change in a volume of a fluid;
a first pipe that connects the dispensing nozzle and the syringe pump;
a first electromagnetic valve that allows the fluid to flow or stops the flow of fluid;

a second pipe that connects the first electromagnetic valve and the syringe pump; a branch pipe that branches the fluid;

a third pipe that connects the first electromagnetic valve and the branch pipe and includes a heat exchange unit for performing heat exchange of the fluid;

a case that contains at least the syringe pump, the first pipe, the first electromagnetic valve, the second pipe, the branch pipe, and the third pipe; and a heat exchange unit accommodating part to which the heat exchange unit is fixed, wherein the heat exchange unit includes a turning part defied by an extending portion of the third pipe that is arranged in a winding that is wound a plurality of times, and has heat exchanging capacity to eliminate a difference between a temperature inside the case and a temperature of fluid in the heat exchange unit, and wherein the heat exchange unit accommodating part is provided on an upper side in the case.

2. The automatic analyzer according to claim 1, wherein the third pipe including the heat exchange unit has an internal capacity that is larger than an amount of the fluid that passes through the first electromagnetic valve when the first electromagnetic valve is opened and the dispensing nozzle is cleaned.

3. The automatic analyzer according to claim 1, further comprising:
a device control unit that controls the syringe pump and the first electromagnetic valve; and
a power supply unit that generates an operational power supply for the automatic analyzer,
wherein the heat exchange unit is disposed above at least one of the device control unit and the power supply unit.

4. The automatic analyzer according to claim 1, wherein a length of the third pipe is longer than a sum of a length of the first pipe and a length of the second pipe.

5. The automatic analyzer according to claim 1, further comprising:
a device control unit that controls the syringe pump and the first electromagnetic valve; and
a power supply unit that generates an operational power supply for the automatic analyzer,
wherein the heat exchange unit accommodating part that accommodates the heat exchange unit is disposed above at least one of the device control unit and the power supply unit.

6. The automatic analyzer according to claim 3, further comprising:
a cleaning tank that sprays the fluid on an outside of the dispensing nozzle;
a circulation pump that circulates the fluid under the control of the device control unit;
a second electromagnetic valve that allows flow of or stops the flow of fluid which is circulated by the circulation pump under the control of the device control unit, and
a pipe that connects the circulation pump and the second electromagnetic valve to the cleaning tank,
wherein in a state where the dispensing nozzle including the sucked sample is moved into the cleaning tank in a time from the sample being sucked until being discharged to the reaction container, the device control unit causes the circulation pump to perform an operation of discharging fluid, controls the fluid discharged from the circulation pump to flow from the second electromagnetic valve, and spray the fluid in the cleaning tank.

* * * * *